United States Patent [19]

Motoyama et al.

[11] Patent Number: 5,058,038

[45] Date of Patent: Oct. 15, 1991

[54] METHOD TO CONNECT WIDE SIZE SCANNER TO LASER PRINTER ENGINE FOR COPYING WITH SIZE REDUCTION

[75] Inventors: Tetsuro Motoyama, San Jose; Hershow Chang, Los Altos, both of Calif.

[73] Assignee: Ricoh Corporation, San Jose, Calif.

[21] Appl. No.: 451,512

[22] Filed: Dec. 13, 1989

[51] Int. Cl.⁵ .......................................... G06K 15/00
[52] U.S. Cl. ..................................... 364/519; 355/311
[58] Field of Search ...................... 364/518, 519, 520; 355/311, 313, 314; 358/296, 486, 471, 451; 346/154

[56] References Cited

U.S. PATENT DOCUMENTS

| | | | |
|---|---|---|---|
| 4,277,163 | 7/1981 | Ikesue et al. | 355/311 |
| 4,486,787 | 12/1984 | Gocho et al. | 358/296 |
| 4,807,156 | 2/1989 | Parisi | 364/519 |
| 4,819,066 | 4/1989 | Miyagi | 364/311 |
| 4,827,433 | 5/1989 | Kamon | 364/518 |
| 4,873,550 | 10/1988 | Watanabe | 355/311 |
| 4,908,672 | 3/1990 | Ito | 355/311 |

Primary Examiner—Arthur G. Evans
Attorney, Agent, or Firm—Flehr, Hohbach, Test, Albritton & Herbert

[57] ABSTRACT

A method to connect a wide sized document scanner to a laser printer engine for copying with size reduction enables the output to be printed on plain paper through a laser printer and digital copier with different paper sizes. The method utilizes an output buffer such that the original document needs to be scanned only once even though multiple copies are requested. The method adjusts input resolution to output device characteristics by manipulating the pulse width of the video signal and matching the number of output lines.

8 Claims, 4 Drawing Sheets

| INPUT PAPER SIZE | OUTPUT PAPER SIZE | EDGE MAPPING | RATIO | REDUCTION RATIO $r$ | REQUIRED INPUT RESOLUTION $400 \times r$ |
|---|---|---|---|---|---|
| C | A | 17-> 8.5<br>22-> 11 | .5<br>.5 | .5 | 200 DPI |
|   | B | 17-> 11<br>22-> 17 | .647<br>.773 | .647 | 258 DPI |
| D | A | 22-> 8.5<br>34-> 11 | .386<br>.324 | .324 | 129 DPI |
|   | B | 22-> 11<br>34-> 17 | .5<br>.5 | .5 | 200 DPI |
| E | A | 34-> 8.5<br>44-> 11 | .25<br>.25 | .25 | 100 DPI |
|   | B | 34-> 11<br>44-> 17 | .324<br>.386 | .324 | 129 DPI |

FIG.–3

RSI

FIG.–5

RSI

FIG.–6

METHOD TO CONNECT WIDE SIZE SCANNER TO LASER PRINTER ENGINE FOR COPYING WITH SIZE REDUCTION

BACKGROUND OF THE INVENTION

The present invention relates to a method to connect a wide size document scanner to a laser printer engine for copying with size reduction.

It is a more particular method to connect a wide scanner such as a flip chart copier (FCC) to laser printer engines including digital copiers. The flip chart copier scans a flip chart (27"×34") and prints letter size (8.5"×11") outputs. The scanning resolution of an FCC is typically 1.176 dots/mm and the printing resolution of the thermal printer is 4 dots/mm.

There are other approaches similar to a flip chart copier (FCC), such as available from Contex A/S of Denmark. In these products, the original sizes of A0 through A3 size paper can be copied to A4 size thermal paper.

There are some copiers which can automatically adjust the magnification to match the original to the copy, such as disclosed in Ikesue et al U.S. Pat. No. 4,277,163. The problem of this approach is that because of the analog process, the data cannot be transferred to other equipment. For example, with wide scanners developed by other vendors, the plotter developer has less control of the optical system. Therefore, the data must be manipulated digitally in order to be plotted.

Kamon U.S. Pat. No. 4,327,433 describes magnification change of image data. The approach in Kamon can control the magnification and reduction in 1% steps. Kamon's method can work in an application when the developer has control over the scanner. In addition, Kamon's method does not require controlling the clock rate or pulse width of the plotter.

However, there are two problems associated with the above approach. First, the FCC was developed with a simple digitization process of scanner. Therefore, if a laser printer needs to interface with the FCC, binary data are already developed by the FCC, leaving no possibility of applying Kamon's method.

Another problem is the cost. Kamon's method requires additional cost over the simple binarization employed by FCC. If the cost is not an issue, the FCC can incorporate Kamon's method. The current digital copiers require multiple scans when multiple copies are requested, even though it is feasible to store the image in the memory.

The control of the pulse width to manipulate the resolution of a laser printer is well known. For example, by doubling the clock width, the horizontal resolution of a 300 DPI printer can be changed into 600 DPI. This type of application was developed to increase the image quality by doubling the addressibility of pixels. Miyagi U.S. Pat. No. 4,819,066 also used a pulse width modulation to increase the quality of gray scale by changing the pixel pulse width. None of these applications were, however, aimed at using pulse width to adjust image size obtained by the different system.

Parisi U.S. Pat. No. 4,807,156 describes adjustable print size by controlling a polygon clock and pixel clock. The method described by Parisi is not available to most of laser printer controller developers who are not the maker of laser printer makers.

SUMMARY OF THE INVENTION

It is an object of the present invention to provide a method to connect wide size document scanners to laser printer engines for copying with size reduction.

According to one aspect of the present invention, the output is printed on plain paper through a laser printer and digital copier with different paper sizes.

Another aspect of the present invention is because an output buffer is used, the original document needs to be scanned only once even though multiple copies are requested.

The present invention uses an improved method to adjust input resolution to output device characteristics (format) by manipulating the pulse width of the video signal and matching the number of output lines.

Other objects, features and advantages of the present invention will become apparent from the following detailed description when taken in conjunction with the accompanying drawings.

BRIEF DESCRIPTION OF THE DRAWINGS

The accompanying drawings which are incorporated in and form a part of this specification illustrate an embodiment of the invention and, together with the description, serve to explain the principles of the invention.

FIG. 3 depicts a table depicting required resolution when the output resolution is 400 DPI.

FIG. 5 depicts a copy of a portion of an output when the video frequency is set to 2.5 MHz and no line is duplicated.

FIG. 6 depicts a copy of a portion of an output similar to FIG. 5, but when the video frequency is set to 1.58 MHz and a line was duplicated three times.

DETAILED DESCRIPTION OF THE DRAWINGS

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Figure 1:
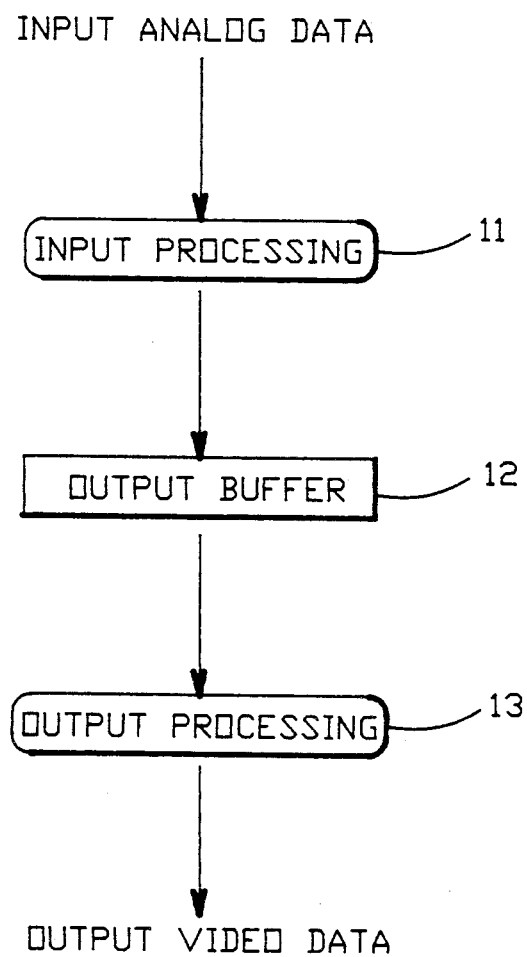
FIG. 1 depicts a flow chart illustrating the operation of the present invention.

FIG. 1 shows a general flow chart of the method according to the present invention. The Input Processing step 11 converts analog data from CCD to binary data of blacks and whites and sends the binary data to the Output Buffer 12. In addition, Input Processing 11 may rotate the binary data before sending to the Output Buffer 12. Rotation is needed when the main scan directions of the scanner and the printer do not match, such as when the shorter edge is scanned during input and the longer edge is scanned during output. The Output Processing step 13 converts binary data to video signals and sends video signals to the laser engine.

In addition, when input resolution differs from required resolution, the Output Processing step 13 may adjust video signals and may duplicate or delete lines as discussed below. Also, at output time, the input from a keypad is used to create multiple copies if a user requested.

Figure 2:
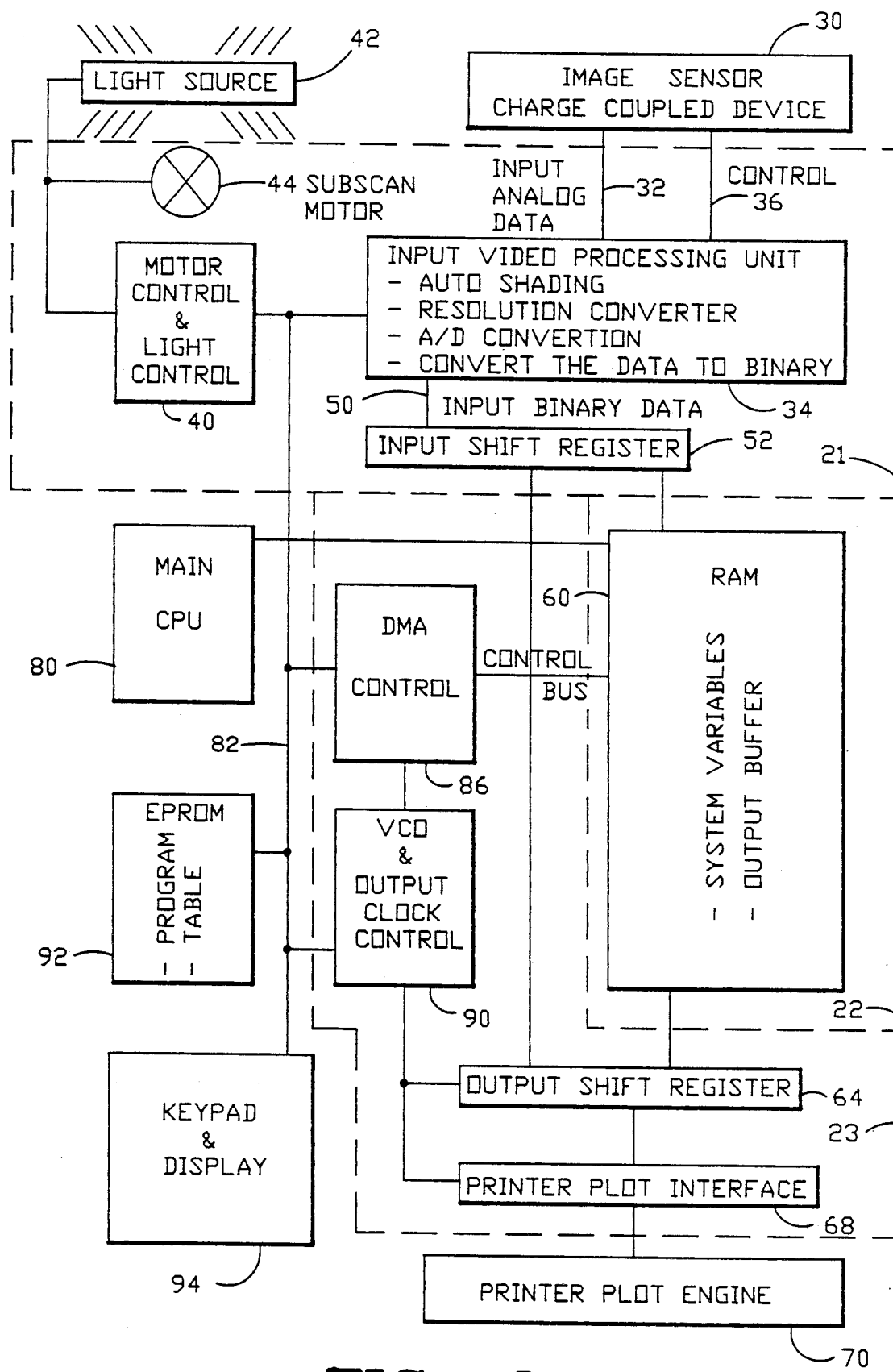
FIG. 2 depicts a block diagram of a system utilizing the improved method according to the present invention.

FIG. 2 shows a block diagram of a system incorporating the improved method according to the present invention. The improved method processes input data from a wide size scanner and sends the data to a laser printer engine. Block 21 of FIG. 2 performs the function of Input Processing 11 in FIG. 1. Block 22 of FIG. 2 contains the Output Buffer 12 of FIG. 1. Block 23 of FIG. 2 performs the function of Output Processing 13 in FIG. 1.

The system block diagram of FIG. 2 includes an image sensor charge coupled device (CCD) 30 to provide input analog data 32 to an input processing unit 34. The input video processing unit (IVP) 34 provides suitable control signals 36 to the image sensor 30.

The IVP unit 34 provides auto shading, resolution converter, analog to digital (A/D) conversion and converts the data to a binary format.

The input video processing unit 34 also controls motor control and light control 40 for a light source 42 and subscan motor 44.

The input binary data 50 is shifted into input shift register 52 for connection to a random access memory (RAM) 60 which contains system variables and the output buffer.

RAM 60 provides an output to an output shift register 64, which shifts the output binary data to the plotter plot interface 68 for connection to a printer plot engine 70, as shown in FIG. 2.

The other components of the system block diagram of FIG. 2 include a main central processing unit (CPU) 80 which interconnects with the other system components via a common bus 82.

The system block diagram of FIG. 2 also includes a DMA control circuit 86, VCO (Voltage Control Oscillator) and output clock control 90, EPROM 92 (with program and table), and a suitable keypad and display 94.

Input Processing 11 includes blocks 34, 40, 44 and 52. Output buffer 12 is RAM 60. Output processing includes blocks 64, 68, 86, and 90.

Most of the processing of input and output can be performed by looking up particular values in Table located in EPROM 92.

For example, in order to accommodate various input sizes, the wide scanner must have different input resolutions of the main and sub scans for different input sizes. In the case of Table I (FIG. 3) discussed below, four different resolutions are needed. For the main scan resolution, it is feasible to generate different input resolutions electronically with table look-up as used by commercially available scanners. However, for the sub scan, the mechanical solution to change the speed of subscan direction by looking the appropriate speed in the table is common.

Required Input Resolution

Table I (FIG. 3) shows an example of input resolutions required to change wide size inputs to the smaller size outputs with 400 dots/inch (DPI) such as the digital copier manufactured by Ricoh Company, Ltd. In order to keep the aspect ratio, the smaller reduction ratio must be used for both edges of inputs. The general equations to generate the values in Table I is as follows:

Let X be the output resolution and r be the reduction ratio. Let LS be the length of the shorter edge and LL be the longer edge of input and output media. Then, r=minimum of (LS of output/LS of input, LL of output/LL of input). The input resolution (IR) is r*X.

The third column of Table I shows the mapping of shorter edges and longer edges. The reduction ratios for these edges are given in the fourth column. The values of reduction ratios, r, are given in the fifth column. Because the output resolution was set to be 400 DPI, the desired input of scanner without any processing is obtained by 400r, as shown in the sixth column of Table I.

When Input Resolution Differs from Required Resolution

The actual resolutions of an input scanner may be different from the computed resolutions obtained above for cost consideration or other reasons. For example, if the required input resolution is 200 DPI and the actual input resolution is 100 DPI, the memory size of the output buffer will be one quarter. In these cases, however, the scanned image must be processed before it is sent to the laser printer in order to obtain the desired output.

Let Rmain be the input resolution of main scan direction and Rsub be the input resolution of the subsca direction. Then, in order to obtain the desired size, the output must be changed as follows:

Main scan pixel must be adjusted by IR/Rmain. When IR/Rmain is one, no further processing is necessary. If IR/Rmain is not one, the video interface pulse to the laser printer must be IR/Rmain of the normal pulse width. Let M be the normal video frequency to the printer. Then the adjusted video frequency is M * Rmain/IR. For example, suppose that the 200 DPI input resolution is obtained from the section above, while the actual scanner input resolution of main scan is 100 DPI even after Input Processing. Then the output video interface to the laser printer must have twice wider pulse for each pixel, i.e., a half of the normal video frequency.

Subscan line must be adjusted by IR/Rsub. When this value is one, no further processing is necessary. IR/Rsub is the ratio where IR lines of output video signals must correspond to Rsub lines of Output Buffer. Suppose that IR is 200 DPI while Rsub is 50 DPI. Then the easiest adjustment is to set the output line of the Output Buffer to be duplicated 200/50 =4 times. Suppose that IR is 100 DPI while Rsub is 200 DPI. Then the easiest adjustment is to set the output line to be every other line in the Output Buffer. Any of the available algorithms to change the size of binary image data can be used by actual implementation of the adjustment.

The resolution of a conventional laser printer is 300 DPI while FCC scanning resolution is 30 DPI. However, it was found that FCC's main scanning resolution was 60 DPI and every other pixel was used for printing purpose, resulting in the effective scanning resolution of 30 DPI. Therefore, in order to get better image, the main scan resolution of 60 DPI was used while the subscan resolution of 30 DPI was kept.

The effective scanning region of the FCC is 680 mm × 840 mm, while the effective output region of the laser printer is 203.2 mm × 266.7 mm. Therefore, the resolution ratio, r, is minimum (203.2/680, 266.7/840)=0.299. The required resolution, IR, is 300×0.299=89.65 DPI which is roughly 90 DPI.

The normal video output frequency to the laser printer is 2.54 MHz for the main scan. The desired frequency for the output, therefore, is M×Rmain-/IR=2.54×60/90=1.69 MHz. For the subscan, IR/Rsub=90/30×3. Therefore, one line of scanned image must be duplicated to three output lines.

Figure 4:
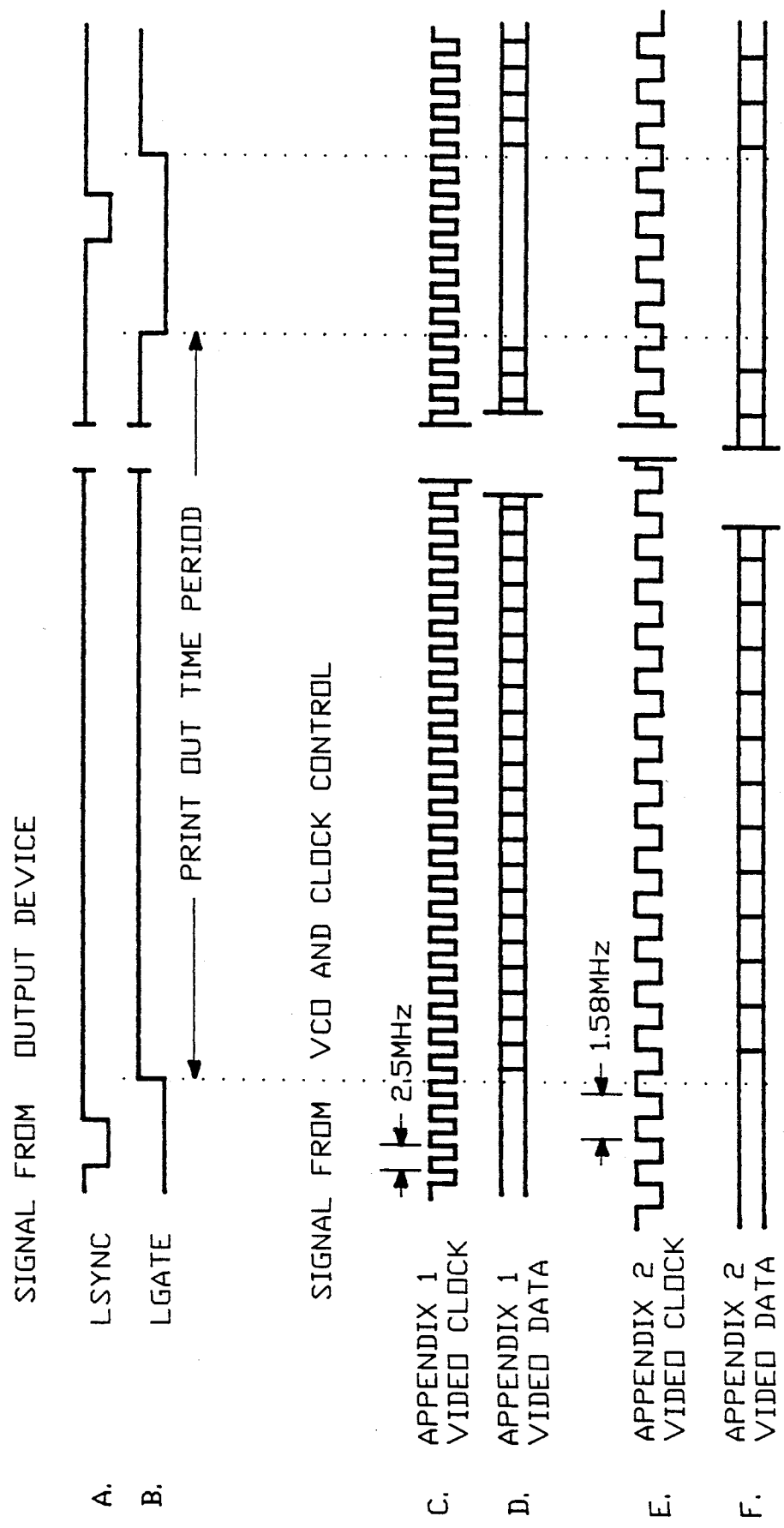
FIGS. 4A-4F depict timing diagrams for illustrating adjustable video timing signals for use with the method of the present invention.

FIG. 4 depicts a diagram of an adjustable video timing signal. In FIGS. 4A and 4B, the LSYNC and LGATE signals from an output device are shown together with a print out time period. FIG. 4C depicts a video clock signal of 2.5 MHz.

FIG. 4D depicts video data (in conjunction with the copy depicted in FIG. 5).

FIG. 4E depicts a video clock signal of 1.58 MHz, and FIG. 4F depicts the video data. FIGS. 4E and 4F correspond to the copy depicted in FIG. 6.

It can be seen in FIG. 4 that the adjustable video timing signals provide one aspect of the improved method of recording of the present invention when taken in conjunction with FIGS. 5 and 6 respectively.

FIG. 5 shows the copy of a portion of the output when the video frequency was set to 2.5 MHz and no line was duplicated. Notice that the image is much smaller and stretch to the main scan direction.

FIG. 6 shows the copy of a portion of the output when the video frequency was set to 1.58 MHz and a line was duplicated three times. Because of the parts used, 1.69 MHz could not be generated. The image of this output is stretched slightly (1.69/1.58=1.09) in the main scan direction.

The foregoing description of the preferred embodiment of the invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical applications to thereby enable others skilled in the art to best utilize the invention and various embodiments and with various modifications as are suited to the particular use contemplated. It is intended that the scope of the invention be defined only by the claims appended hereto.

What is claimed is:

1. A method for connecting a wide size document scanner to a laser printer engine for copying said document with size reduction, said method comprising the steps of scanning said document to generate input binary data representative of the information on said document and of the size of said document, determining the reduction ratio of the size of the scanned document to the size of the copied document, including matching the input resolution of the scanned document to the output format of said laser printer engine.

2. The method as in claim 1 wherein the reduction ratio step includes edge mapping different sizes of the wide size document.

3. The method as in claim 2 wherein said reduction ratio step includes determining the ratio of the edge mapping step.

4. The method as in claim 3 including the step of selecting the smaller of the different ratios.

5. The method as in claim 4 including the step of determining the required input resolution.

6. The method as in claims 1 or 5 including the step of scanning the wide size document only once in order to produce multiple copies.

7. The method as in claim 1 wherein the data signals include video clock signals with certain pulse width and including the step of manipulating the pulse width of said video signal.

8. The method as in claim 7 including the step of matching the number of output lines.

* * * * *

UNITED STATES PATENT AND TRADEMARK OFFICE
CERTIFICATE OF CORRECTION

PATENT NO. : 5,058,038

DATED : October 15, 1991

INVENTOR(S) : Motoyama, Tetsuro, and Change Hershow

It is certified that error appears in the above-identified patent and that said Letters Patent is hereby corrected as shown below:

On the title page, item [73], after "Assignee:" insert
--Ricoh Co., Ltd., Tokyo, Japan--.

At column 1, line 68, delete "makers".
At column 4, line 29, change "subsca" to --subscan--.
At column 5, line 7, change "90/30 x 3" to --90/30 = 3 --.

Signed and Sealed this

Thirteenth Day of April, 1993

*Attest:*

STEPHEN G. KUNIN

*Attesting Officer*     *Acting Commissioner of Patents and Trademarks*